July 10, 1962   E. J. GARBARINO ETAL   3,043,550
RETRACTABLE ROPE HOOK
Filed Aug. 14, 1961   3 Sheets-Sheet 1
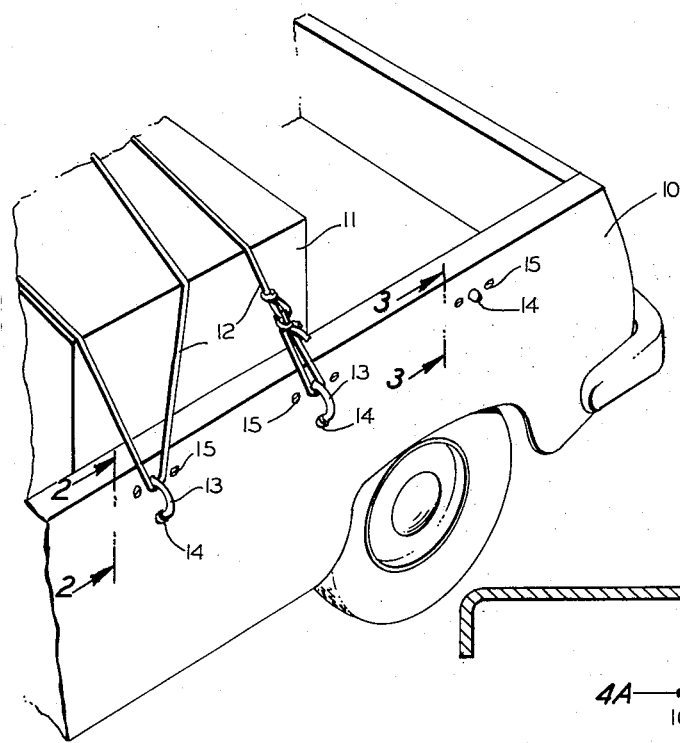
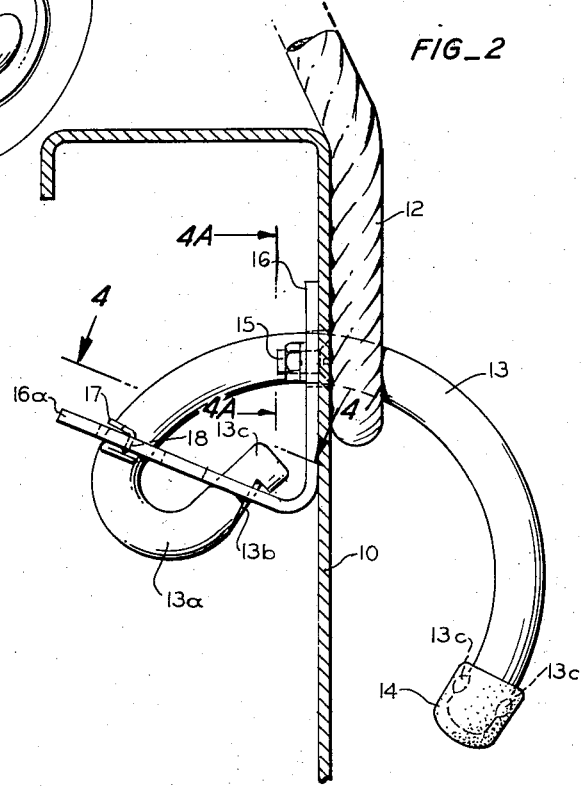
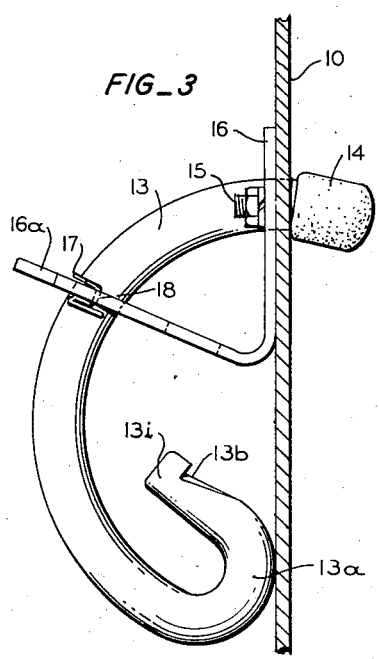
INVENTORS
EDWIN J. GARBARINO
ANTONIO MANFRE
BY
*Allen and Chromy*
ATTORNEYS

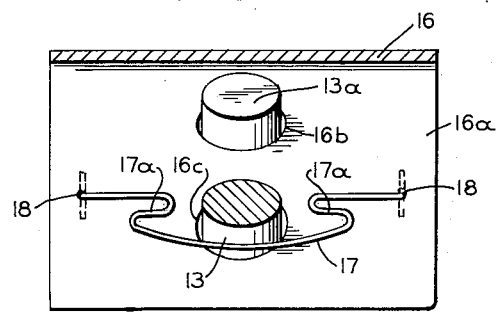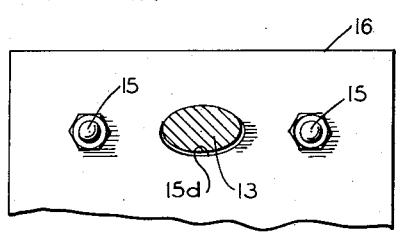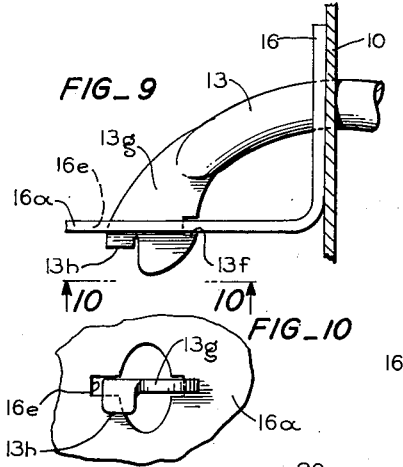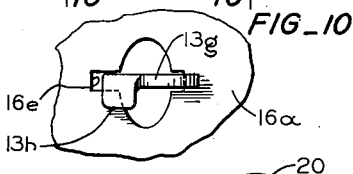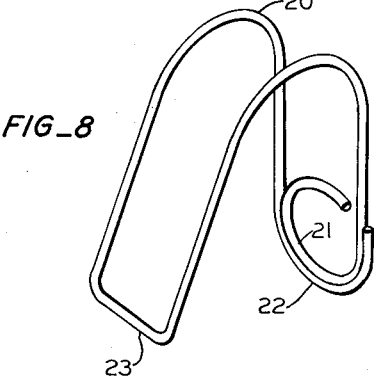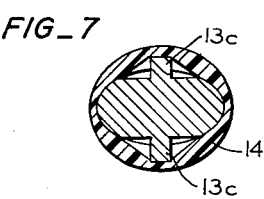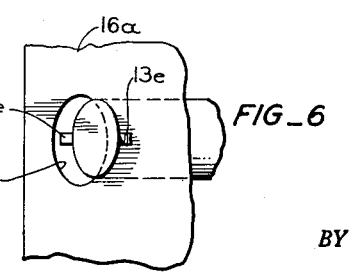

July 10, 1962 E. J. GARBARINO ETAL 3,043,550
RETRACTABLE ROPE HOOK
Filed Aug. 14, 1961 3 Sheets-Sheet 3
FIG_11
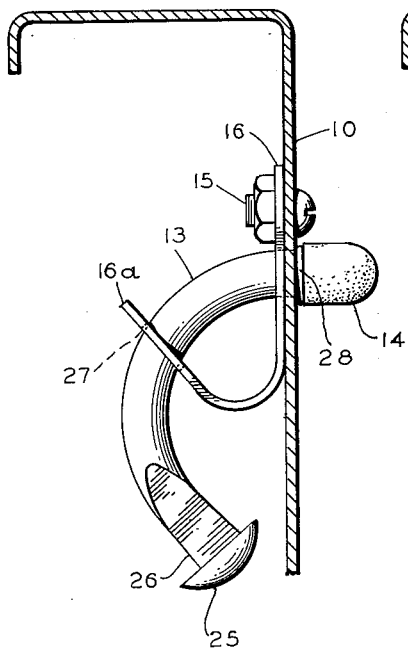
FIG_12
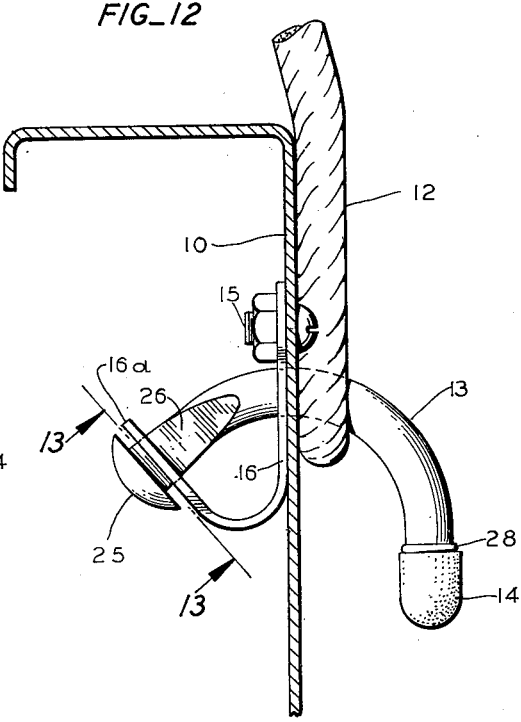
FIG_13
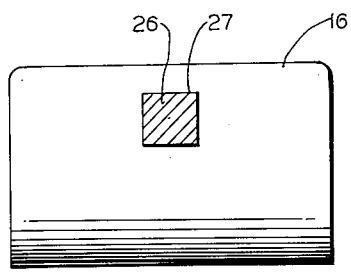
INVENTORS
EDWIN J. GARBARINO
ANTONIO MANFRE
BY *Allen & Chenny*
ATTORNEYS

United States Patent Office 3,043,550
Patented July 10, 1962

3,043,550
RETRACTABLE ROPE HOOK
Edwin J. Garbarino, 1180 Hester Ave., and Antonio
Manfre, 2996 Fruitdale Ave., both of San Jose, Calif.
Filed Aug. 14, 1961, Ser. No. 131,332
10 Claims. (Cl. 248—361)

This invention relates to a retractable rope hook.

This application is a continuation in part of our abandoned application Serial No. 7,255 filed February 8, 1960, for Retractable Rope Hook.

An object of this invention is to provide an improved retractable rope hook that may be installed on the sides of truck bodies to provide means for anchoring load retaining ropes.

Another object of this invention is to provide an improved rope hook that is retractable when not in use and which is highly efficient in use and relatively inexpensive to manufacture.

Still another object of this invention is to provide an improved retractable rope hook that is self-locking when rope under tension is anchored thereon.

Another object of this invention is to provide an improved rope hook that may be installed in the sides of vehicles such as small pickup trucks so that load anchoring ropes may be attached thereto, said rope hooks being retractable so that they may be substantially concealed in the vehicle body when not in use.

Other and further objects of this invention will be apparent to those skilled in the art to which it relates from the following specification, claims and drawing.

In accordance with this invention there is provided an improved retractable rope hook that is adapted for installation in the sides of vehicles such as small pickup trucks and the like, to provide means for anchoring load retaining ropes to the sides of the vehicle. The rope hook of this invention may of course be employed in other installations where such a retractable rope hook is desirable.

The rope hook of this invention is of generally semi-circular configuration and it is positioned in suitable holes formed in an angular bracket member which is attached on the inside of the vehicle body by means of suitable bolts or screws and a suitable aperture is provided in the body through which the retractable rope hook may be extended when it is to be used for anchoring a rope thereto.

This rope hook is also provided with means such as a head portion, a small bend or crimped portion to prevent the rope hook from being completely extended out of the supporting bracket and vehicle side wall. Additional means such as a tapered portion which is adapted to be wedged into the aperture formed in the bracket is also provided to the rope hook to lock it in place when the load anchoring rope is attached thereto.

These and other features of this invention will be set forth in the following specification, claims and drawing in which, briefly:

FIG. 1 is a fragmentary perspective view of the rear portion of a pickup truck body to which several retractable rope hooks of this invention are shown attached;

FIG. 2 is a sectional view taken along the line 2—2 of FIG. 1 showing the rope hook extended outward so that the rope may be anchored thereto;

FIG. 3 is a sectional view taken along the line 3—3 of FIG. 1 showing the rope hook in retracted position;

FIG. 4 is a sectional view taken along the line 4—4 of FIG. 2;

FIG. 4A is a sectional view taken along the line 4A—4A of FIG. 2;

FIG. 5 is a sectional view showing another embodiment of this invention, and in this view the rope hook is shown extended in solid lines and retracted in broken lines;

FIG. 6 is a sectional view taken along the line 6—6 of FIG. 5;

FIG. 7 is a sectional view taken along the line 7—7 of FIG. 5;

And FIG. 8 is a detailed view of a spring which may be employed in conjunction with the rope hook shown in FIG. 5;

FIG. 9 is a fragmentary view of another embodiment of this invention;

FIG. 10 is a view taken along the line 10—10 of FIG. 9;

FIG. 11 is a side view of an important embodiment of this invention in which the rope hook is shown in retracted position;

FIG. 12 is a side view similar to FIG. 11 showing the rope hook in extended position with the tapered portion thereof frictionally held in an aperture of the rope hook bracket; and FIG. 13 is a sectional view taken along the line 13—13 of FIG. 12.

Referring to the drawing in detail there is shown in FIG. 1 a fragmentary perspective view of the rear of a small pickup truck body 10 on the side of which the retractable rope hooks 13 of this invention are mounted. Similar retractable rope hooks are mounted on the other side of the truck body, although only one side is shown. These rope hooks 13 comprise a body portion of generally semi-circular shape, which may be slipped into the inside of the automobile body through a suitable hole so that the rope hook is concealed except for the small plastic cap 14 that is provided to the outer end thereof. In its retracted position, the rope hook is supported as shown in the sectional view, FIG. 3. When the rope 12 is to be attached to the rope hook, the body portion of the rope hook is partly withdrawn and positioned on the outside of the truck body 10. Thus the rope may be tightly anchored on the rope hooks as shown in FIGS. 1 and 2 for holding down the boxes 11 in the truck body.

The rope hook 13 is positioned in the holes 16b and 16c that are formed in the side 16a of the angle shaped bracket member 16. A hole corresponding to the hole 15d formed in the member 16 shown in FIG. 4A, is also formed in the side 10 of the truck body in alignment with the hole 15d so that the rope hook body 13 may be passed freely through these aligned holes after the angle member 16 is attached to the inside of the truck body by means of the bolts 15. The hole 15d in the angle bracket 16 is of a size such that the crimped portions 13c formed on the rope hook prevent the hook from being drawn through this hole so that the hook cannot be completely retracted. These projections 13c also function to hold the plastic cap 14 on the end of the hook. The plastic cap 14 is not necessary although it may be found useful in keeping the hook end from catching in workmen's apparel.

The form of the rope hook shown in FIGS. 2 and 3 comprises a body portion of generally semi-circular shape and the inside end portion 13a thereof is bent back into the arcuate body portion to form a small auxiliary hook that is adapted to be lodged in the holes 16b and 16c of the member 16a shown in FIG. 4, when the hook is in its extended position as shown in FIG. 2. In this position the notch 13b formed near the end 13i of the hook is in engagement with a side of the hole 16b so that the hook cannot be pushed back into its retracted position by the force pulling on the rope 12.

A suitable spring 17 which is formed with S-shaped loops 17a as shown in FIG. 4, is supported on the member 16a with the end portions of this spring positioned in the holes 18. Such a spring may be provided for pressing against the hook so as to urge the notch 13b into engagement with the side of the hole 16b so as to provide a safety measure to prevent the hook from unlatching itself in case slack develops in the rope 12.

Another form of this invention is illustrated in FIG. 5 in which the inner end portion of the rope hook 13 is provided with two small projections 13e to prevent the rope hook from being withdrawn from the side of the bracket member through the hole 16c formed therein. These projections 13e may be formed by crimping the sides of the end portion of the hook the same as the projections 13c are formed at the other end. A notch 13d is provided adjacent to one of the projections 13e and this notch is of a shape such that it receives one of the sides of the hole 16c to latch the rope hook when it is in extended position. A spring which is of the configuration shown in FIG. 8 is provided for the purpose of pressing the rope hook notch 13d into engagement with the opposing side of the hole 16c of the bracket member 16a. This spring is provided with looped ends 21 and 22 which fit loosely around the aligned holes formed in the side 10 of the truck body and the bracket member 16 so that these loops substantially encircle the body of the hook 13. These portions of the spring 20 are firmly clamped between the body 10 and the member 16 by the bolts 15 which also function to support the bracket on the body 10 and the spring is held so that the portion 23 thereof engages the hook 13 and presses the notch 13d thereof into engagement with the side wall of the aperture 16c.

In FIG. 9 there is illustrated still another modification of this invention in which the end portion 13g of the rope hook 13 is pressed flat. The portion 13h of this flat end is bent substantially at right angles thereto to prevent the rope hook from being completely retracted out of the hole 16e of the bracket member 16a, when the hook is pulled out and extended from the side 10 of the vehicle. This hole 16e is provided with a shape such that the flattened end portion 13g may be moved therethrough up to the projection 13h and the body portion of this hook may also pass through the rounded portion of this hole so that the hook may be slipped through said hole to its retracted position. A notch 13f is provided in one side of the flattened portion 13g and this notch engages one end of the hole 16e opposite thereto when the projection 13h is up against the bracket 16a and when the rope hook 13 is extended for use. The notch 13f functions to lock the rope hook in its extended position and if desired a spring such as a spring 17 shown in FIG. 4 may be provided to the bracket member 16a to apply spring tension to the rope hook to press the notch 13f against the side of the hole 16e opposite thereto and hold the hook in locked extended position.

In FIGS. 11, 12 and 13 there is illustrated a further modified form of this invention in which corresponding parts are designated by the same reference numerals as are used in the preceding figures. In this form of the invention, the body portion of the hook 13 is made with a substantially circular cross-section and the holes through the bracket 16 and body portion 10 of the vehicle through which this rope hook is adapted to slide are also of substantially circular shape. The rope hook is adapted to slide in these holes so that it may be readily partially withdrawn from inside of the vehicle body to the position shown in FIG. 12 in which the rope 12 is adapted to be placed under the hook. In this case the portion 16a of the bracket is provided with a substantially square hole 27 for the purpose of receiving the substantially square tapered portion 26 of the rope hook. Other polygonal shapes may be employed for the hole 27 and tapered part 26 if desired. The forward portion of this tapered part is somewhat smaller than the hole 27 and the portion of this tapered part next to the head 25 is slightly larger than the hole 27. Thus this tapered portion may be wedged into the hole 27 when the rope hook is extended as shown in FIG. 12 and in this extended position the tapered portion 26 and the hole 27 frictionally engage each other so that the rope hook is not only held in extended position by this frictional engagement but it is also prevented from turning in the hole in the bracket part 16a. When the rope 12 is tightly attached to the rope hook 13, as shown in FIG. 12, the hook is held in firm engagement with the upper surfaces of the holes formed in the bracket 16 and vehicle body 10. However, the bracket 16 is attached to the vehicle body 10 by means of a pair of bolts or screws 15 so that this bracket 16 forms a reinforcing structure with the vehicle body which prevents deforming of the vehicle body by the pressure exerted on the rope 12, since this pressure is exerted in the vertical direction along the rope.

When the rope hook is retracted into the vehicle body, as shown in FIG. 11, so that only the tip thereof projects on the outside of the vehicle body, the complete retraction of the rope hook is prevented by means of a split ring 28 which is lodged in a suitable groove formed in the rope hook body member. This split ring is larger than the hole in the vehicle body so that it engages the sides of this hole and prevents the hook from being completely retracted. A suitable cap 14, which may be made of plastic material or similar material is provided to the end of the rope hook to cover up any sharp edges thereof and prevent such edges from ripping and tearing of workmen's clothing.

While we have shown a preferred embodiment of the invention it will be understood that the invention is capable of variation and modification from the form shown so that its scope should be limited only by the scope of the claims appended hereto.

What we claim is:

1. In a retractable rope hook adapted to be mounted on a wall structure so as to be extended therefrom through a hole formed therein, the combination comprising an elongated body member of generally arcuate shape slidably supported in a hole formed in wall structure so that said body member may be extended beyond the front of said wall structure when rope is to be anchored thereto, a bracket positioned on the back of said wall structure and having a bracket member extending away from said wall structure, said bracket member having a hole for slidably receiving said elongated body member, and means on said bracket member for holding said elongated body member in extended position when rope under tension is anchored to said body member.

2. In a retractable rope hook adapted to be mounted on a wall structure so as to be extended therefrom through a hole formed therein, the combination comprising an elongated body member of generally arcuate shape slidably supported in a hole formed in wall structure so that said body member may be extended beyond the front of said wall structure when rope is to be anchored thereto, a bracket positioned on the back of said wall structure and having a bracket member extending away from said wall structure, said bracket member having a hole for slidably receiving said elongated body member, said elongated body member having means engaging said bracket member for holding said body member in extended position, when a rope under tension is anchored to said body member.

3. In a retractable rope hook adapted to be mounted on a wall structure so as to be extended therefrom through a hole formed therein, the combination comprising an elongated body member of generally arcuate shape slidably supported in a hole formed in wall structure so that said body member may be extended beyond the front of said wall structure when rope is to be anchored thereto, a bracket positioned on the back of said wall structure and having a bracket member extending away from said wall structure, said bracket member having a hole for slidably receiving said elongated body member, said elongated body member having a recessed portion for engaging a side of said hole in said bracket member for latching said body member in extended position when rope under tension is anchored to said body member.

4. In a retractable rope hook adapted to be mounted on a wall structure so as to be extended therefrom through a hole formed therein, the combination comprising an elongated body member of generally arcuate shape slidably supported in a hole formed in wall structure so that said body member may be extended beyond the front of said wall structure when rope is to be anchored thereto, a bracket positioned on the back of said wall structure and having a bracket member extending away from said wall structure, said bracket member having a hole for slidably receiving said elongated body member, said elongated body member having a hook formed thereon for engaging said bracket member to hold said body member in extended position when rope under tension is anchored to said body member.

5. In a retractable rope hook adapted to be mounted on a wall structure so as to be extended therefrom through a hole formed therein, the combination comprising an elongated body member of generally arcuate shape slidably supported in a hole formed in wall structure so that said body member may be extended beyond the front of said wall structure when rope is to be anchored thereto, a bracket positioned on the back of said wall structure, said bracket having a hole aligned with said first mentioned hole for slidably receiving said body member, said bracket having a bracket member extending away from said wall structure, said bracket member having a hole for slidably receiving said elongated body member, and means on said body member cooperating with one of said holes for locking said elongated body member in extended position when rope under tension is anchored to said body member.

6. In a retractable rope hook adapted to be mounted on a wall structure so as to be extended therefrom through a hole formed therein, the combination comprising an elongated body member of generally arcuate shape slidably supported in a hole formed in wall structure so that said body member may be extended beyond the front of said wall structure when rope is to be anchored thereto, means positioned on the back of said wall structure for slidably receiving said elongated body member, means for locking said elongated body member in extended position and spring means for urging said body member into its locked position.

7. In a retractable rope hook adapted to be mounted on a wall structure so as to be extended therefrom through a hole formed therein, the combination comprising an elongated body member of generally arcuate shape slidably supported in a hole formed in wall structure so that said body member may be extended beyond the front of said wall structure when rope is to be anchored thereto, said body member having an out of round cross section and said hole also being of similar out of round shape for engaging said body member and substantially preventing it from turning therein, a bracket positioned on the back of said wall structure and having a bracket member extending away from said wall structure, said bracket member having a hole for slidably receiving said elongated body member, and means for locking said elongated body member in extended position so that said body member may be engaged by said rope.

8. In a retractable rope hook adapted to be mounted on a wall structure so as to be extended therefrom through a hole formed therein, the combination comprising an elongated body member of generally arcuate shape slidably supported in a hole formed in wall structure so that said body member may be extended beyond the front of said wall structure when rope is to be anchored thereto, a bracket positioned on the back of said wall structure and having a bracket member extending away from said wall structure, said bracket member having a hole for slidably receiving said elongated body member, means for locking said elongated body member in extended position and means on said body member to prevent withdrawal thereof from said hole in said bracket member.

9. In a retractable rope hook adapted to be mounted on a wall structure so as to be extended therefrom through a hole formed therein, the combination comprising an elongated body member of generally arcuate shape slidably supported in a hole formed in wall structure so that said body member may be extended beyond the front of said wall structure when rope is to be anchored thereto, a bracket member positioned on the back of said wall structure, said bracket member having an extension which extends away from said wall structure, said bracket member having a hole for slidably receiving said elongated body member, said elongated body member having a tapered portion, the rearward part of said tapered portion being slightly larger than said hole in said bracket member, said slightly larger portion of said tapered part being adapted to be in engagement with said hole when said elongated body member is in extended position so the said slightly larger tapered portion is adapted to hold said body member in extended position by frictional engagement with the hole in said bracket member.

10. In a retractable rope hook adapted to be mounted on a wall structure so as to be extended therefrom through a hole formed therein as set forth in claim 9 further characterized in that said tapered portion cross section is of substantially polygonal shape and the hole in said bracket member is of similar shape whereby when the said tapered portion is in frictional engagement with said hole in said bracket member the body portion of the rope hook is prevented from turning therein.

References Cited in the file of this patent
FOREIGN PATENTS
185,663     Great Britain _____ Sept. 14, 1922